(12) United States Patent
Ishiyama

(10) Patent No.: US 9,760,771 B2
(45) Date of Patent: Sep. 12, 2017

(54) IDENTIFICATION METHOD, IDENTIFICATION SYSTEM, MATCHING DEVICE, AND PROGRAM

(71) Applicant: NEC Corporation, Minato-ku, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 14/781,990

(22) PCT Filed: Mar. 28, 2014

(86) PCT No.: PCT/JP2014/059282
§ 371 (c)(1),
(2) Date: Oct. 2, 2015

(87) PCT Pub. No.: WO2014/163015
PCT Pub. Date: Oct. 9, 2014

(65) Prior Publication Data
US 2016/0048730 A1 Feb. 18, 2016

(30) Foreign Application Priority Data
Apr. 4, 2013 (JP) ................................ 2013-078802

(51) Int. Cl.
*G06K 9/00* (2006.01)
*G06K 7/14* (2006.01)
(Continued)

(52) U.S. Cl.
CPC ....... *G06K 9/00577* (2013.01); *G06K 7/1447* (2013.01); *G06K 9/2054* (2013.01);
(Continued)

(58) Field of Classification Search
USPC ....... 382/100, 103, 106, 108, 111, 152, 155, 382/162, 168, 173, 180–181, 189–190,
(Continued)

(56) References Cited

U.S. PATENT DOCUMENTS

| 8,357,935 | B2 * | 1/2013 | Matsumaru | ........... H01L 21/565 257/48 |
| 9,036,916 | B2 * | 5/2015 | Le | ....................... G06K 9/00577 382/141 |

(Continued)

FOREIGN PATENT DOCUMENTS

| CN | 1577393 A | 2/2005 |
| CN | 101789005 A | 7/2010 |

(Continued)

OTHER PUBLICATIONS

Lorenzo Cozzella et al., "Drug packaging security by means of white-light speckle", Optics and Lasers in Engineering, Elsevier, Amsterdam, NL, vol. 50, No. 10, May 21, 2012, pp. 1359-1371, XP028500046.
(Continued)

*Primary Examiner* — Seyed Azarian

(57) ABSTRACT

The present invention addresses the problem of acquiring information regarding a component or product and identifying said component or product easily and inexpensively. The present invention has an image-feature storage, an extracting means, an acquiring means, and an identifying means. The image-feature storage stores image features of texture patterns formed on components or products. The extracting means extracts an n-dimensional-symbol image and a texture-pattern image from a taken image containing at least the following: an n-dimensional symbol (n being a natural number) that represents information regarding a component, a product, or a product comprising said component; and a texture pattern formed on said component or
(Continued)

product. The acquiring means acquires, from the extracted n-dimensional-symbol image, the aforementioned information regarding the component or product. The identifying means identifies the component, product, or component-comprising product by matching image features of the extracted texture-pattern image against the image features stored by the image-feature storage.

21 Claims, 10 Drawing Sheets

(51) Int. Cl.
G06K 9/20 (2006.01)
G06K 9/42 (2006.01)
G06K 9/46 (2006.01)
B41J 2/01 (2006.01)

(52) U.S. Cl.
CPC ............ *G06K 9/2072* (2013.01); *G06K 9/42* (2013.01); *G06K 9/4609* (2013.01); *G06K 2209/21* (2013.01); *G06K 2209/25* (2013.01)

(58) Field of Classification Search
USPC ....... 382/199, 219, 224, 232, 243, 254, 274, 382/305, 312, 141, 154; 257/48; 705/26.61; 235/494; 347/107
See application file for complete search history.

(56) References Cited

U.S. PATENT DOCUMENTS

| 2002/0097906 | A1* | 7/2002 | Ishiyama | G06K 9/00268 |
| | | | | 382/154 |
| 2004/0056105 | A1* | 3/2004 | Silverbrook | B41J 2/1623 |
| | | | | 235/494 |
| 2005/0220349 | A1 | 10/2005 | Furuya et al. | |
| 2013/0022238 | A1* | 1/2013 | Wood | G07D 7/2033 |
| | | | | 382/103 |
| 2013/0024326 | A1* | 1/2013 | Dearing | G06Q 30/02 |
| | | | | 705/26.61 |
| 2013/0054344 | A1 | 2/2013 | Iizaka | |
| 2013/0088555 | A1* | 4/2013 | Hanina | B41J 3/407 |
| | | | | 347/107 |
| 2014/0086474 | A1 | 3/2014 | Le | |

FOREIGN PATENT DOCUMENTS

| JP | 2005010581 A | 1/2005 |
| JP | 2005-129016 A | 5/2005 |
| JP | 2006-338331 A | 12/2006 |
| JP | 2007-089969 A | 4/2007 |
| JP | 2007-108973 A | 4/2007 |
| JP | 2008-009539 A | 1/2008 |
| JP | 2008-098949 A | 4/2008 |
| JP | 2008-133495 A | 6/2008 |
| JP | 2009-284455 A | 12/2009 |
| JP | 2010081039 A | 4/2010 |
| JP | 2012-043953 A | 3/2012 |
| JP | 2013-050787 A | 3/2013 |
| JP | 2013039002 A1 | 3/2013 |
| WO | 2012/126008 A2 | 9/2012 |

OTHER PUBLICATIONS

Extended European Search Report for EP Application No. EP14779213.9 dated on Oct. 28, 2016.
International Search Report for PCT Application No. PCT/JP2014/059282, mailed on Jun. 3, 2014.
Chinese Office Action for CN Application No. 201480031981.4 dated May 17, 2017 with English Translation.
Counterpart Japanese Office Action corresponding to Japanese Patent Application No. 2015-510062, dated Aug. 2, 2017.

* cited by examiner

LARGER BLACK REGION FOR GREATER Θ, RESULTING IN LARGER PORTION OF TEXTURE IMAGED IN BLACK

SMALLER BLACK REGION FOR SMALLER Θ, RESULTING IN SMALLER PORTION OF TEXTURE IMAGED IN BLACK

INFORMATION ACQUISITION AND REGISTRATION UNIT

FIG. 5

| SERIAL NUMBER | IMAGE CHARACTERISTICS | MANAGEMENT INFORMATION |
|---|---|---|
| 1001 | AAA | XXXXXXXXX |
| 1002 | BBB | XXXXXXXXX |
| . . . | . . . | . . . |

OK: EDGE WIDTH > 2 GRANULARITY

NG: EDGE WIDTH < 2 GRANULARITY

OK : EDGE WIDTH > 2 GRANULARITY

NG : EDGE WIDTH < 2 GRANULARITY

IDENTIFICATION METHOD, IDENTIFICATION SYSTEM, MATCHING DEVICE, AND PROGRAM

This application is a National Stage Entry of PCT/JP2014/059282 filed on Mar. 28, 2014, which claims priority from Japanese Patent Application 2013-078802 filed on Apr. 4, 2013, the contents of all of which are incorporated herein by reference, in their entirety.

TECHNICAL FIELD

The present invention relates to an identification method, an identification system, a matching device, and a program.

BACKGROUND ART

Generally, for the purpose of indication of source, quality control, and distribution management, a logo or an identification code which indicates information of a part or a product is assigned to the part and the product.

Further, there is such a technology that, for the purpose of counterfeit protection of a part and a product and individual identification of a part or a product to which an identical mark or an identical code is assigned, an RFID (Radio Frequency Identification) tag, etc. is used to perform certification and identification of the part or the product. Patent literature 1 discloses one example of such technology. More specifically, patent literature 1 discloses such a system that an IC tag is wound around an adherend to fix the tag thereon, and the adherend is identified by using the IC tag.

CITATION LIST

Patent Literature

[PATENT LITERATURE 1] JP 2008-009539A

SUMMARY OF INVENTION

Technical Problem

In recent years, the generally used bar code is read out by using a reader or the like. The bar code includes effective information to be used in quality control and distribution management. However, the bar code can be changed or counterfeited with ease and has an upper limit in an information volume. Therefore, the bar code is not safe enough to identify an individual.

Now, in order to avoid the change and the counterfeit, it is proposed to attach an RFID as disclosed in patent literature 1 to achieve accurate individual identification. However, this requires a large cost.

Further, in a case of attaching the RFID to each individual, it is required for one who is in charge of an identification operation to read information on a part or a product and to read certification information of the RFID, etc. separately. This leads to a problem of a larger cost and much time consumption.

The present invention was made to solve the above described problem. A purpose of the present invention is to provide an identification method capable of performing acquisition of information on a part or a product and identification of a part or a product at low cost without involving unnecessary time-consumption, an identification system, a matching device, and a program.

Solution to Problem

The invention of the present application for solving the above described problem is directed to an information acquisition and identification system including image characteristics storage means storing image characteristics of textured patterns formed on component or products, extracting means extracting an image of an n-dimensional (n: natural number) symbol and an image of a textured pattern from an image including at least the n-dimensional symbol which indicates information on a part, a product, or a product including the part as its component and a textured pattern formed on the part or the products, acquiring means acquiring information on the part or the products from the extracted image of the n-dimensional symbol, and identifying means identifying the part, the product, or the product including the part as its component by matching image characteristics of the extracted image of the textured pattern with image characteristics stored in the image characteristics storage means.

The invention of the present application for solving the above described problem is directed to a processing system including textured pattern forming means forming a textured pattern for identifying a part, a product, or a product including the part as its component on a part, a product, or a product including the part as its component to which an n-dimensional symbol displaying information on the part or the products is attached.

The invention of the present application for solving the above described problem is directed to a registration system including image capturing means capturing, under specific image capturing conditions, an image including at least an n-dimensional symbol which indicates information on a part, a product, or a product including the part as its component and a textured pattern provided on the part or the products to which the n-dimensional symbol is attached, the textured pattern having granularity smaller than a short side of a cell of the n-dimensional symbol, extracting means extracting an image of the textured pattern from the captured image, and registering means registering identification information for identifying the part or the products and image characteristics of the extracted image of the textured pattern in storing means after they are associated with each other.

The invention of the present application for solving the above described problem is directed to a matching device including extracting means extracting an image of an n-dimensional symbol and an image of a textured pattern from an image including at least the n-dimensional symbol which indicates information on a part, a product, or a product including the part as its component and the textured pattern formed on the part or the products, acquiring means acquiring information on the part or the products from the extracted image of the n-dimensional symbol, and acquiring and outputting means acquiring and outputting a check result obtained by checking the extracted image of the textured pattern against a database which stores image characteristics of textured patterns formed on component or products.

The invention of the present application for solving the above described problem is directed to an information acquisition and identification method including extracting an image of an n-dimensional symbol and an image of a textured pattern from an image including at least the n-dimensional symbol which indicates information on a part, a product, or a product including the part as its component and the textured pattern formed on the part or the products, acquiring information on the part or the products from the extracted image of the n-dimensional symbol, and identifying the part or the product including the product as its component by using image characteristics of the extracted image of the textured pattern.

The invention of the present application for solving the above described problem is directed to a program causing a computer to perform extraction processing extracting an image of an n-dimensional symbol and an image of a textured pattern from an image including at least the n-dimensional symbol which indicates information on a part, a product, or a product including the part as its component and the textured pattern formed on the part or the products, acquisition processing acquiring information on the part or the products from the extracted image of the n-dimensional symbol, and acquiring and outputting processing acquiring and outputting a check result obtained by checking the extracted image of the textured pattern against database which stores image characteristics of the formed textured pattern.

Advantageous Effect of Invention

The present invention ensures acquisition of information on a part or a product and identification of a part or a product at low cost without involving unnecessary time-consumption.

BRIEF DESCRIPTION OF DRAWINGS

FIG. 5 exemplifies contents stored in an image characteristics database.

DESCRIPTION OF EMBODIMENTS

Figure 1:
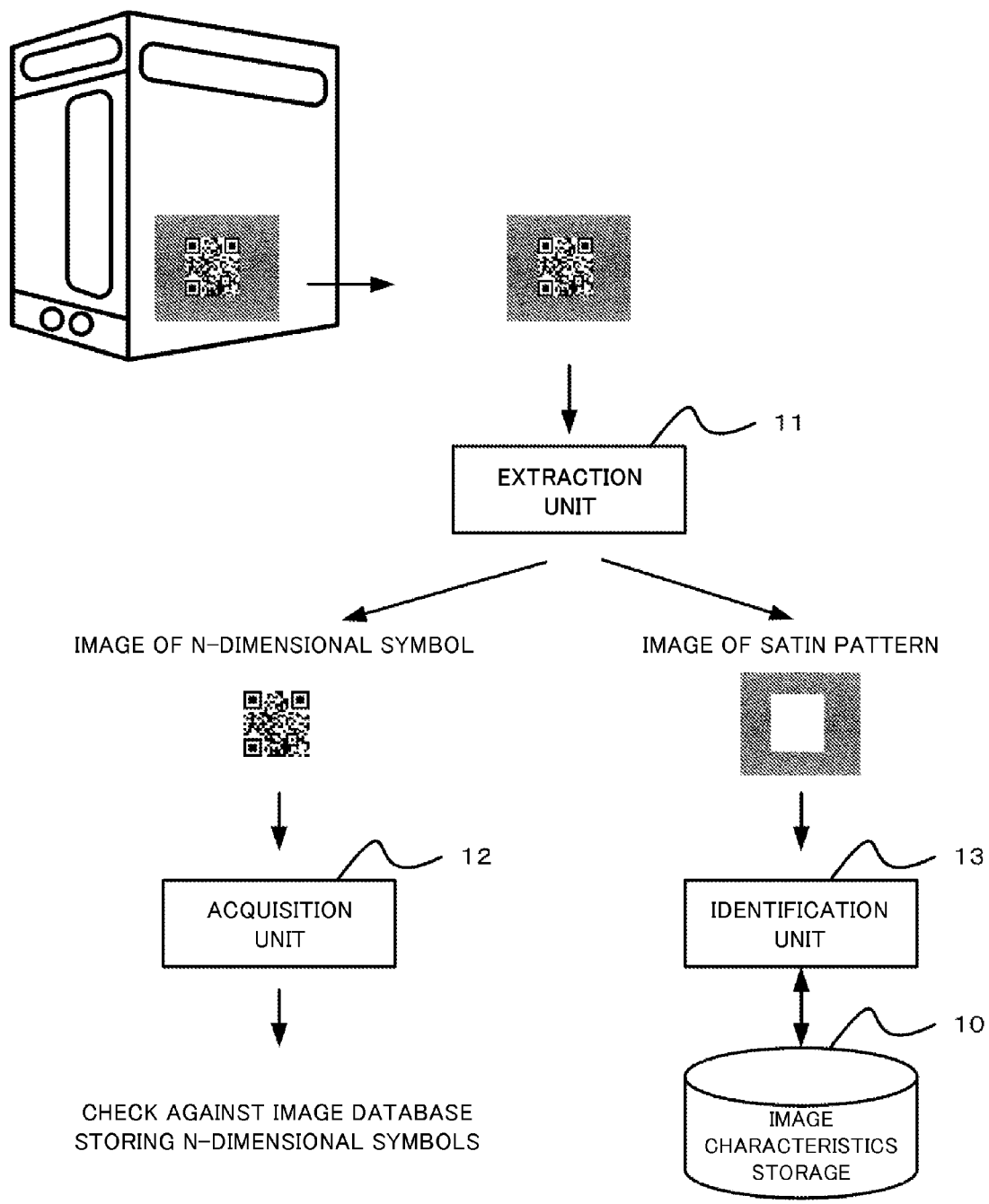
FIG. 1 is a block diagram of a first embodiment according to the present invention.

The present invention is characterized by extracting an image of an n-dimensional (n: natural number) symbol and an image of a textured pattern formed on at least a portion of the n-dimensional symbol from an image of the n-dimensional symbol which is attached to a part or a product, acquiring information on the part or the product from the extracted image of the n-dimensional symbol, and identifying the part or the product by using the extracted image of the textured pattern.

The invention according to the present application will be described below.

The part is a part manufactured by a manufacturer. Examples of the part include logo plates, fastening component (rivets, slide fasteners, hook and loop fasteners, snap fasteners, rail fasteners, buckles, cord stoppers, belt adjusters, swivels, snap buttons, buttons, etc.), bolts, nails, packages and outer covers of semiconductor chips, component of electronic equipment (PC cases, power sources, cooling fans, etc.) typified by PC (Personal Computer) terminals, etc., plastic parts, machine parts, etc. of gear frame bearing wheels (vehicles, bicycles, etc.). Further, it is not necessary for the part of the present invention to be always integrally attached to the other part or product. It is possible for the part of the present invention to include an item capable of temporarily sealing or fixing something, e.g., containers (cans, caps, battery packs, etc.) and seals or labels (fastening plates, etc.), etc.

The product is a product manufactured by a manufacturer or a product purchased by a consumer. Examples of the product include apparel products such as bags and clothes, watches, accessories, leather products, metalworking products (building materials such as window sashes (window frames), keys, tools such as wrenches and sockets, wristwatches, golf clubs, etc.), wood products, industrial products (semiconductor chips and electronic equipment mounted with semiconductor chips, etc.), etc.

The n-dimensional symbol includes a one-dimensional symbol and a two-dimensional symbol, etc. An example of the one-dimensional symbol includes a bar code. Examples of the two-dimensional symbol include a PDF 417, a DataMatrix, a MaxiCode, and a QR (Quick Response) code (registered trademarks).

The textured pattern formed on the part or the product includes both of a textured pattern which is formed on a part or a product for a decorative purpose and a textured pattern which is formed on a part or a product on purpose in order to identify the part or the product. Further, the textured pattern includes, for example, scratches, minute irregularities, and design patterns which are generated naturally or on purpose on a surface of a casting during manufacturing and processing by means of machining or press working.

Here, the textured pattern may be formed throughout the n-dimensional symbol and its background or partially thereon, may be formed on the background excepting the n-dimensional symbol, may be formed on the n-dimensional symbol partially or in its entirety, or may be formed on a portion where a textured pattern of which image is to be captured is specified by the n-dimensional symbol. Meanwhile, the textured pattern should not be formed on a blank portion which is essential for reading out the n-dimensional symbol. For example, the textured pattern should not be formed on a quiet zone in a case of a bar code or on square shaped cut-out symbols provided at three corners (position detection patterns or finder patterns) in a case of a QR code.

Figure 9:
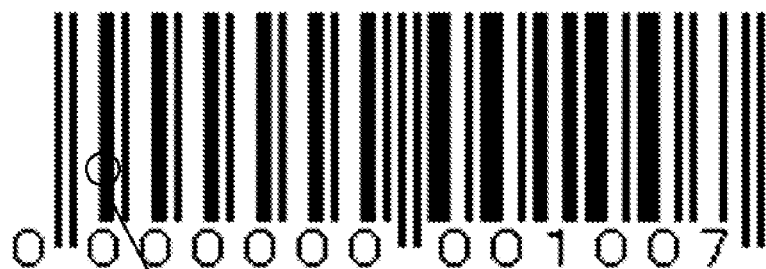
FIG. 9 illustrates granularities of textured patterns.
Figure 9:
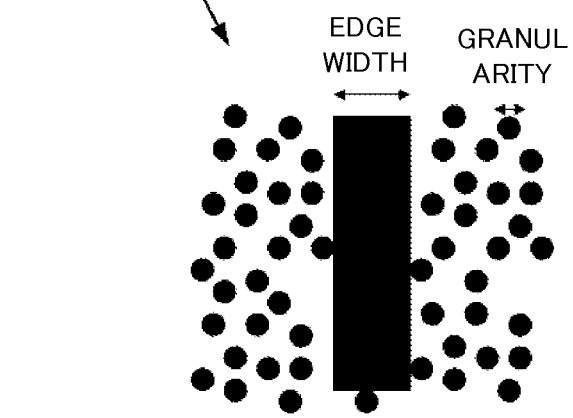
Figure 9:
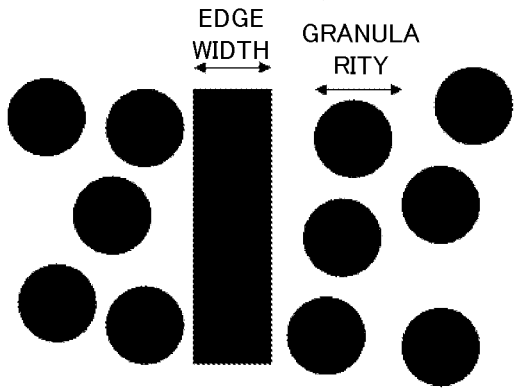
Figure 10:
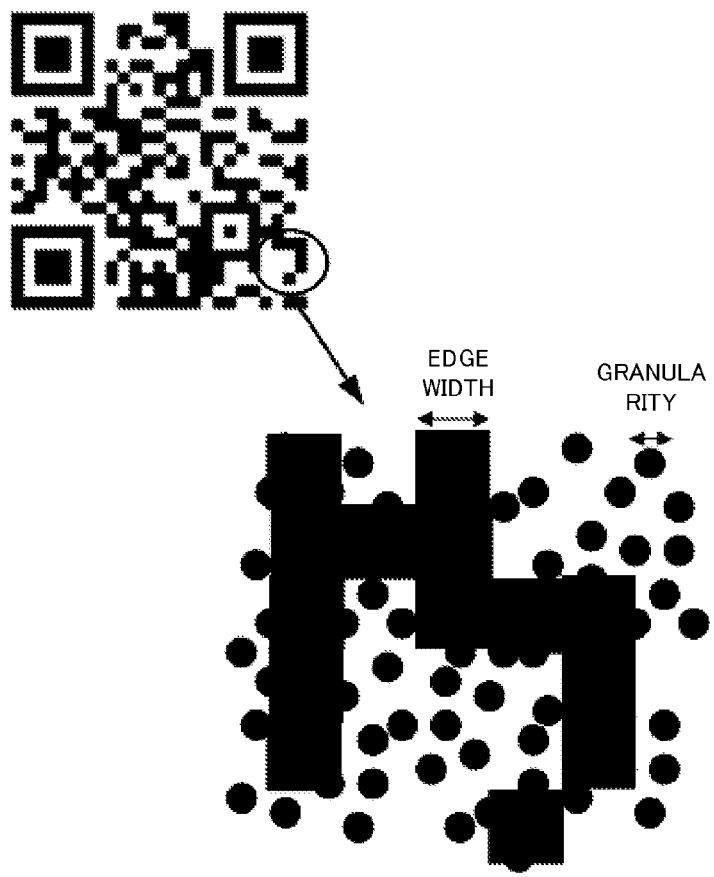
FIG. 10 illustrates granularities of textured patterns.
Figure 10:
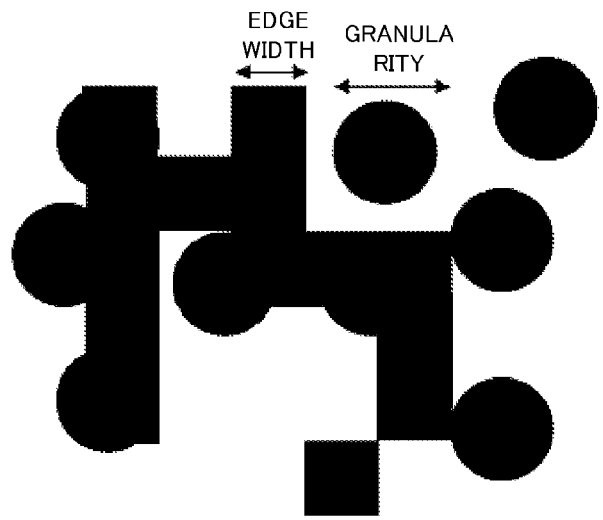

A size of a particle of a textured pattern or a degree of granularity (e.g., a size, a diameter, a density, etc. of a particle) of each irregular section of a textured pattern or an aggregate made of adjacent irregular sections of a textured pattern may be at any level in so far as recognition of an n-dimensional symbol is not affected. This can be achieved by setting the granularity when a satin finished surface is formed. For example, granularity of the textured pattern is set to a degree smaller than a short side (edge width) of a cell of the n-dimensional symbol. More preferably, granularity of the textured pattern is set to a degree, as illustrated in FIG. 9 or FIG. 10, equal to or smaller than a half of the edge width in a manner that the captured image can be recognized as an n-dimensional symbol. Hereinafter, a bar code as a one-dimensional symbol and a QR code as a two-dimensional symbol will be exemplified for more detailed description.

As will be described below, when assuming that a filter for removing a high frequency component corresponding to granularity of a satin finished surface is employed to remove a textured pattern, as illustrated in FIG. 9, if granularity of a satin finished surface is larger than a half of an edge width of a rectangular bar as a cell of a bar code, the bar is partially removed when removing the satin finished surface, resulting in making the bar defective. A typical bar code can be read out even if the bar code includes even a portion capable of crossing through all the bars. However, a portion crossing through all the bars may possibly disappear according to a position of the textured pattern. To solve the above problem, if the granularity of at least the satin finished surface is made to a degree smaller than the edge width of the bar, chipping of edge can be avoided to eliminate possible disappearance of the portion which crosses through all the bars.

On the other hand, as illustrated in FIG. 10, in a case of a QR code, if granularity of the satin finished surface is set to a degree smaller than a half of an edge width of each cell of the QR code, it becomes possible to prevent the QR code from being defective because of a partial removal of the cell. This ensures to prevent the QR code from a possible unreadable situation. Further, the QR code may be subjected to a blast working in order to generate a low density by using dots smaller than those of cells of the n-dimensional symbol. Meanwhile, it is possible for the n-dimensional symbol to correct the defective portion by means of a correction function of the n-dimensional symbol for repairing missing portion. Therefore, when processing a textured pattern, granularity of the textured pattern may be adjusted in the light of the correction function.

In extraction processing of extracting an image of the n-dimensional symbol and an image of the textured pattern from the captured image, the image of the n-dimensional symbol is obtained by removing the textured pattern from the captured image by using a frequency filter for removing a high frequency component corresponding to the granularity of a satin finished surface. The satin finished surface was deleted. Then, a blurred image of the n-dimensional symbol is recovered, as required, by using a recovery technique for recovering a low resolution image. For example, a super resolution technique disclosed in WO2012/029238 may be used as the recovery technique. Another recovery technique may be also employed. Then, an image of the textured pattern is obtained by taking a difference between an original image and the captured image (image of the n-dimensional symbol) from which the high frequency component was removed. Further, the n-dimensional symbol is expressed in binary such as black and white. Therefore, it is possible to obtain the image of the n-dimensional symbol by removing the textured pattern by means of adjustment of a threshold of resolution in the extraction processing of extracting the image of the n-dimensional symbol and the image of the textured pattern from the captured image.

First Embodiment

A first embodiment according to the present invention will be described below. FIG. 1 is a block diagram of the first embodiment according to the present invention.

The identification system of the first embodiment according to the present invention includes an image characteristics storage unit 10, an extraction unit 11, an acquisition unit 12, and an identification unit 13.

The image characteristics storage unit 10 stores image characteristics of textured patterns formed on n-dimensional symbols, each n-dimensional symbol being attached to a part, a product, or a product including the part as its component.

The extraction unit 11 extracts an image of the n-dimensional symbol and an image of the textured pattern from an image of the n-dimensional symbol.

The acquisition unit 12 acquires information on the part or the products from the extracted image of the n-dimensional symbol.

The identification unit 13 identifies the part, the product, or the product including the part as its component by matching the extracted image of the textured pattern with image characteristics stored in the image characteristics storage unit 10.

In the below description, a QR code as a two-dimensional symbol is the n-dimensional symbol, a PC case is the part, and a PC terminal is the product. The PC terminal including the PC case as its component is exemplified as a product to be identified, the PC case being provided with the QR code on which a textured pattern is formed.

The extraction unit 11 obtains an image of the QR code of the PC case to extract an image of the QR code and an image of the textured pattern from the captured image.

There are mainly two methods for providing the textured pattern on the QR code.

One of the two methods is a method for providing a textured pattern to a die which manufactures a part by means of mold injection or casting. Various methods such as etching and blasting can be employed for providing a textured pattern to a die. In a general method, granularity, etc. of a satin finished surface can be controlled; however, it is impossible to accurately reproduce a size or a position of each one of minute convexes/concaves. More specifically, a different pattern is generated in each time when a textured pattern is formed. Therefore, in a case where a plurality of dies are manufactured for manufacturing the same articles, the minute convexes/concaves on a satin finished surface-processing area of each die differ for each casting die. As a matter of course, in a case of producing a counterfeit, it is possible to counterfeit a die which is similar at a glance. However, it is hard to perfectly copy every one of the minute convexes/concaves of the satin finished surface. With the method, it is possible to provide almost the same textured pattern to all the individuals manufactured from the same die. In other words, a different die provides different minute characteristics to a textured pattern. In such case, at least one individual of a group of individuals (group of articles) manufactured by a certain die is selected, and image characteristics of a textured pattern of a collation area of the individual is considered as a representative value working as a reference for identification. The representative value is registered in the image characteristics storage unit 10. With the method, a part or a product having image characteristics similar to the registered image characteristics by a level equal to or greater than a prescribed similarity can be identified as the part or the product on which the textured patterntextured pattern is formed by the die. That is, the group of individuals (group of component or group of products) manufactured from a specific die can be advantageously collated by using a small amount of registration data.

The other one of two methods is a method of providing a satin finished surface by generating a minute convex/concave design randomly on each individual by means of, for example, etching, blasting, machining, crystal/powder coating, dispersed plating, etc., or by generating minute surface asperities by means of plating or coating. In such method, thus formed textured pattern differs for each individual. Image characteristics of the textured pattern formed on the collation area of the each individual (each part or each product) are registered in the image characteristics storage unit 10 one by one. According to the method, since the textured pattern differs for each individual (for each part or for each product), the image characteristics can be advantageously collated (identified) by individual unit of part or product.

Further, it is possible to combine the above described two methods. More specifically, it is possible for a portion provided with a textured pattern by die processing to be further subjected to coating or plating, thereby facilitating generation of an individual difference in minute convexes/concaves. This can further improve discrimination between individuals. At the time, a difference in characteristics between dies remains, whereas a difference in characteristics between individuals generated by the processing is further added thereto. This enables identification by both of die unit and individual unit. Specifically, if an irregularity provided on a satin finished surface of a die is roughen more than an irregularity made in the below mentioned processing on a satin finished surface, it becomes possible to make the difference in die unit larger than the difference in individual unit. With the above described method, with respect to a threshold for a similarity of an amount of characteristics at the time of collation (at the time of identification), a threshold at the time of identification in die unit can be more moderate than a threshold at the time of identification in individual unit. Accordingly, it becomes possible to perform collation with a small amount of registration data as described above. Further, by taking this advantage, it becomes possible initially to perform identification in die unit to decrease an amount of data to be collated and, subsequently, to perform identification of individual. Such progressive identification ensures decrease of a load of identification processing.

Next, image capturing of the textured pattern of the QR code, extraction of image characteristics of the textured p pattern of the QR code, and registration thereof in the image characteristics storage unit 10 will be described. In the present embodiment, the image characteristics of the textured pattern formed on the QR code will be preliminary extracted to be stored in the image characteristics storage unit 10. In processing to provide a satin finished surface by a die, several number of PC cases which were provided with satin finished surfaces by the die are selected, and images of QR codes of the PC cases are captured by a photograph device. In processing for providing a satin finished surface, an image of a QR code of each of the PC cases is captured by a photograph device. Image characteristics are extracted from the captured images of the textured patterns and are registered in the mage characteristics storage unit 10. Meanwhile, it is possible to extract the image characteristics from the captured image by means of an extraction technology for extracting image characteristics of a finger print. More specifically, a luminance value and a feature point of an image, an inflection point of a line of a binarized image, an interunit point, an inter-edge point, and a central point of an image are extracted by the extraction technology.

Further, when registering image characteristics of a PC case in the image characteristics storage unit 10, management information on a PC terminal including the PC case as one of its components is also registered therein after it is associated with the image characteristics of textured pattern. Accordingly, identification of the PC case enables identification of the PC terminal.

Here, in some cases, image characteristics of textured patterns differ from one another between the same component or between the same products according to lighting conditions when capturing images thereof. This is because, positions of shadows generated by the irregularities of the textured patterns differ from one another depending on light irradiation directions, and thus the image characteristics appear to be different. Therefore, it is preferable to capture images of collation areas always under the same lighting conditions.

Therefore, it is preferable to use, for example, a photographing auxiliary tool and a photograph device for capturing an image of a collation area of a part or a product. Hereinafter, examples of the photographing auxiliary tool and the photograph device used in the present embodiment will be described.

Figure 2:
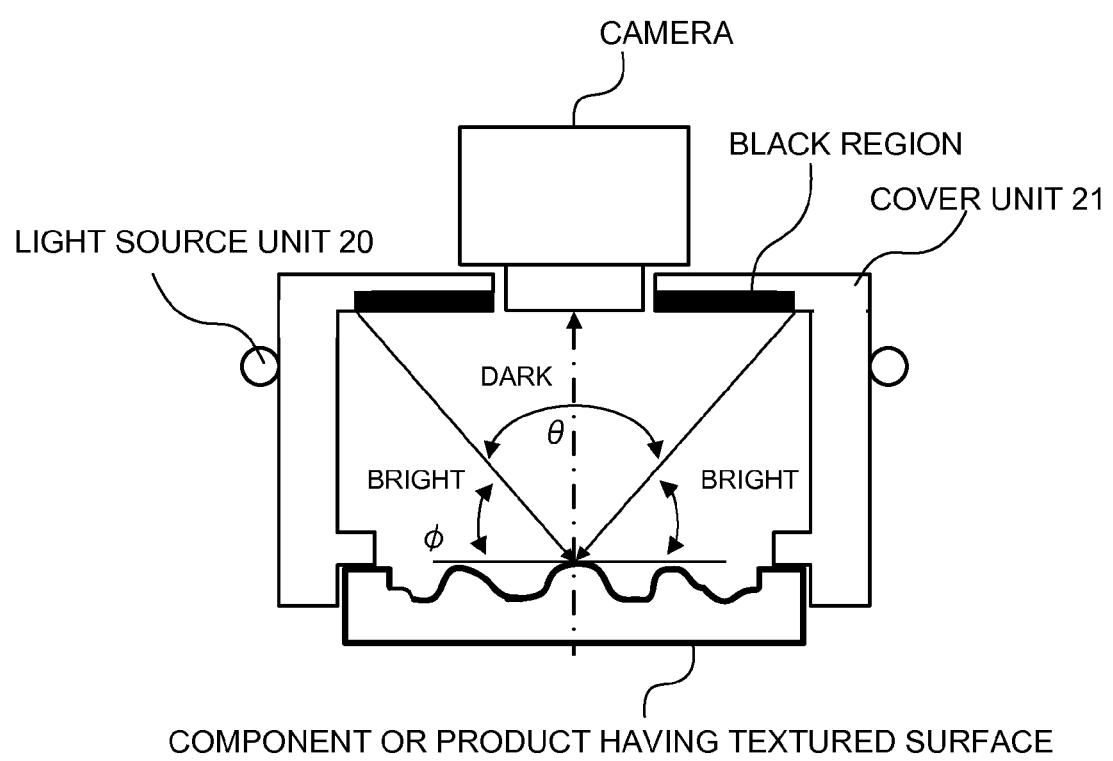
FIG. 2 illustrates a configuration of a photographing auxiliary tool and a photograph device to be employed in the embodiment.

FIG. 2 illustrates a photographing auxiliary tool and a photograph device used in the present embodiment. The photographing auxiliary tool of the present embodiment assists capturing of an image of a collation area on a surface having minute convexes/concaves and having strong mirror reflection, e.g., on a satin finished surface with a textured pattern. The photographing auxiliary tool of the present embodiment includes a light source 20 and a covering portion 21. The light source 20 emits light. The covering portion 21 is formed into a shape capable of covering a prescribed area of a surface of a part or a product and includes a black ground zone and light source area-including surfaces. The black ground zone is configured that a portion of a surface corresponding to a range within a prescribed angular range from a normal direction, the portion of the surface facing to the prescribed area, absorbs light. The light source area-including surfaces are configured that surfaces corresponding to a range within the other angular ranges disperse and emit the light source 20, i.e., disperse and emit light from the light source 20.

For example, the covering portion 21 is formed in parallel with a satin finished surface and provided with an image capturing hole for capturing an image from the normal direction of the satin finished surface. The covering portion 21 is provided with an upper surface which includes a black ground zone at a position facing to the satin finished surface and side surfaces which are perpendicular to the upper surface. The side surfaces are made of a material which disperses light of light source 20.

The black background zone of the covering portion 21 is defined by an angular range θ of a dark zone and an angular range φ of a light zone with respect to a normal line of a surface within a collation area of a satin finished surface of a part or a product (e.g., a top surface of a convex portion residing at a center of a collation area). As described above, a distribution between the black ground zone and the dispersed surfaces is defined only by the angular range with respect to the normal direction of the satin finished surface. More specifically, the dispersed surfaces may have any shape or any angle. In other words, the description that the dispersed surfaces made of the dispersing member are perpendicular to the black ground zone is a mere example. The dispersed surfaces made of the dispersing member may be formed into any shape or have any placement angle. Similarly, the black ground zone does not necessarily have a plane surface but may have any shape in so far as the black ground zone is capable of covering the entire range from the normal line of the satin finished surface through the angle θ.

Figure 3:
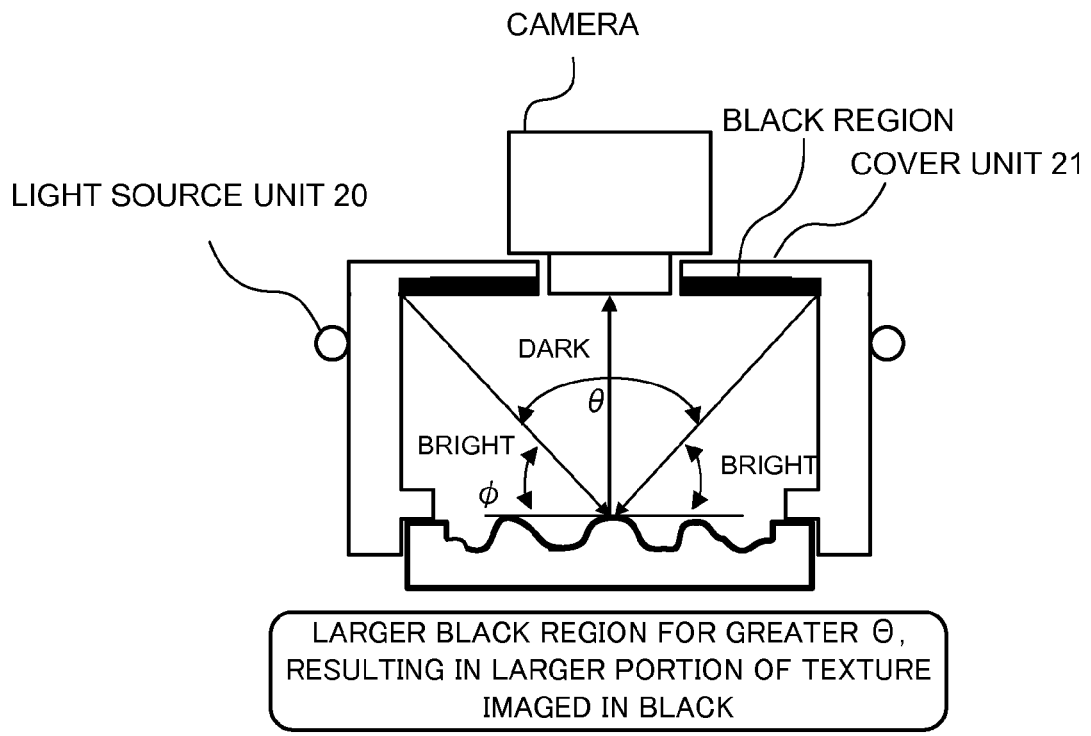
FIG. 3 illustrates a relationship between a size of a black background zone of a covering portion and an angular range 0 of a dark zone of the photographing auxiliary tool and the photograph device of FIG. 2.
Figure 3:
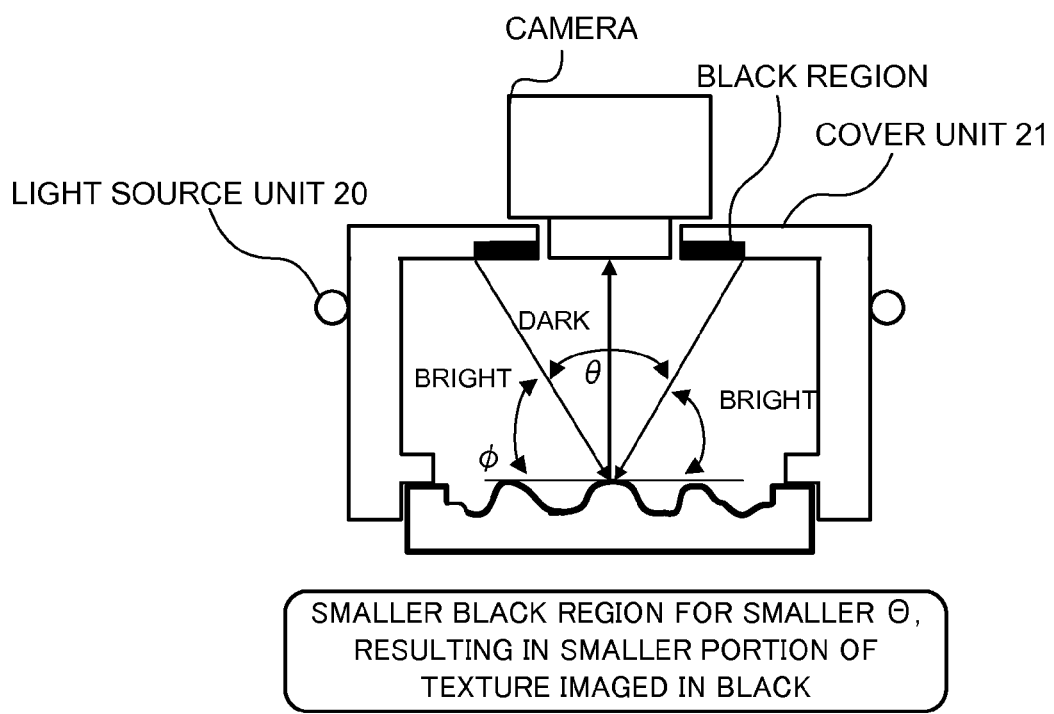

The black background zone of the covering portion 21 does not reflect illumination light from the light source 20. Therefore, a top of the convex portion of the satin finished surface is blacken in the image, the satin finished surface being placed facing to a camera which is fixed to an image capturing hole in an upper surface. As shown in FIG. 3, a size of the black background zone of the covering portion 21 and the angle range θ of the dark zone relates to each other. That is, as the angle range θ of the black dark zone becomes larger, the black background zone of the covering portion 21 also becomes larger. Whereas, as the angle range θ of the dark zone becomes smaller, the black background zone of the covering portion 21 also becomes smaller. Further, as the black background zone of the covering portion 21 becomes larger, the blacken portion of the satin finished surface in an image becomes larger. Whereas, as the black background zone becomes smaller, the blacken portion of the satin finished surface in an image also becomes smaller. In the present embodiment, the angular ranges θ and φ are adjusted in a manner that the number of black pixels within the collation area or a degree of separation of a luminance value of pixels within the collation area in an image of the satin finished surface comes to be a predetermined value (e.g., 25%). More specifically, the size of the black background zone of the covering portion 21 may be changed, or a height of the side surfaces of the covering portion 21 may be changed. This can be achieved by various methods. As one example thereof, a screw mechanism for moving the black background zone up and down can be employed, and thus rotation of the screw mechanism is contributed to adjustment of the height of the side surfaces of the covering portion 21. This is a mere example, and it is possible to employ also other methods.

An actual size of the concaves/convexes of the satin finished surface changes according to a parameter, during processing, of a part or a product to be identified. Therefore, it is possible to optimize a luminance distribution of a captured image by adjusting angular ranges θ and φ to thereby make the black background zone to an adequate size. Meanwhile, a luminance value at which a first differential value of a histogram of a luminosity change becomes the maximum value is employed as a threshold at the time of binarization.

Accordingly, the top of the convex portion of the satin finished surface having the normal line in the direction facing to the camera is blacken in the image, whereas the concave portion of the satin finished surface not facing to the camera receives lights from various directions and reflection of the lights causes the concave portion to be whitened in the image. Therefore, it is possible to obtain an image having a clearly enhanced contrast in light and shade of the irregular section. As a result, the top can be extracted as a feature point in a stable manner.

The extraction unit 11 performs image processing of extracting image characteristics of a QR code and image characteristics of a textured pattern from an image of a QR code. In the image processing, initially, a filter for removing a high frequency component is applied to the captured image to delete the textured pattern. At the time, a size of the filter is adjusted according to roughness of dots in a satin finished surface formed on a collation area. This ensures deletion of only the textured pattern in the collation area. Accordingly, the satin finished surface was deleted. However, if required, the recovery technique for recovering a low resolution image is used to recover a blurred image of a QR code. A super resolution technique disclosed in, for example, WO2012/029238 may be used. Alternatively, another recovery technique may be also employed. Accordingly, the image of the QR code can be obtained from the captured image. On the other hand, an image of a textured pattern can be obtained by calculating a difference between the captured image and thus obtained image of the QR code.

The information acquisition unit 12 acquires information on a PC case and a PC terminal having the PC case as its component by using the image of the QR code extracted by the extraction unit 11.

The identification unit 13 extracts image characteristics from the image of the textured pattern extracted by the extraction unit 11. Normally, the QR code is provided with position detection patterns at three corners thereof. It is preferable to extract the image characteristics after normalizing the image of the textured pattern by using the position detection patterns as reference sections. This enables normalization of at least one of an orientation and a size of the image of the satin finished surface and a portion to be identified within the extracted image of the textured pattern. The normalization in the present embodiment includes normalization of geometrical transformations including at least one of a size, a position, and an orientation of a captured image and a portion to be identified within a textured pattern, etc., normalization of a luminance value of a captured image, etc. Further, in a case of a bar code, at least one of margins provided at both sides of the bar code, a left guard bar, a center bar, and a right guard bar of the bar code is set to be a reference section. Extraction of characteristics from the image of the textured pattern thus normalized may be performed by means of extraction technology for extracting image characteristics of a finger print. More specifically, a luminance value and a feature point of an image, an inflection point of a line of a binarized image, an interunit point, an inter-edge point, and a central point of an image are extracted by the extraction technology. Then, collation of the extracted image characteristics with image characteristics of textured patterns registered in the image characteristics storage unit 10 ensures identification of a PC case. Identification of a PC case enables identification of a PC terminal based on management information corresponded to image characteristics of the PC case.

As described above, according to the present embodiment, an image of the n-dimensional symbol attached to a part or a product and an image of the textured pattern can be read out at the same time, and therefore, acquisition of information on the part or the product (information common to products to which the same n-dimensional symbol is attached) and each individual identification of the part or the product having the same n-dimensional symbol can be performed efficiently. Further, it is easy to find the n-dimensional symbol, so that a person in charge of an identification operation can easily specify a location of capturing an image of the textured pattern and an orientation and a size of thus captured image of a satin finished surface when the person identifies the part or the product.

Example 1

The present example will be described exemplifying a case where the QR code in the first embodiment indicates a serial number.

Figure 4:
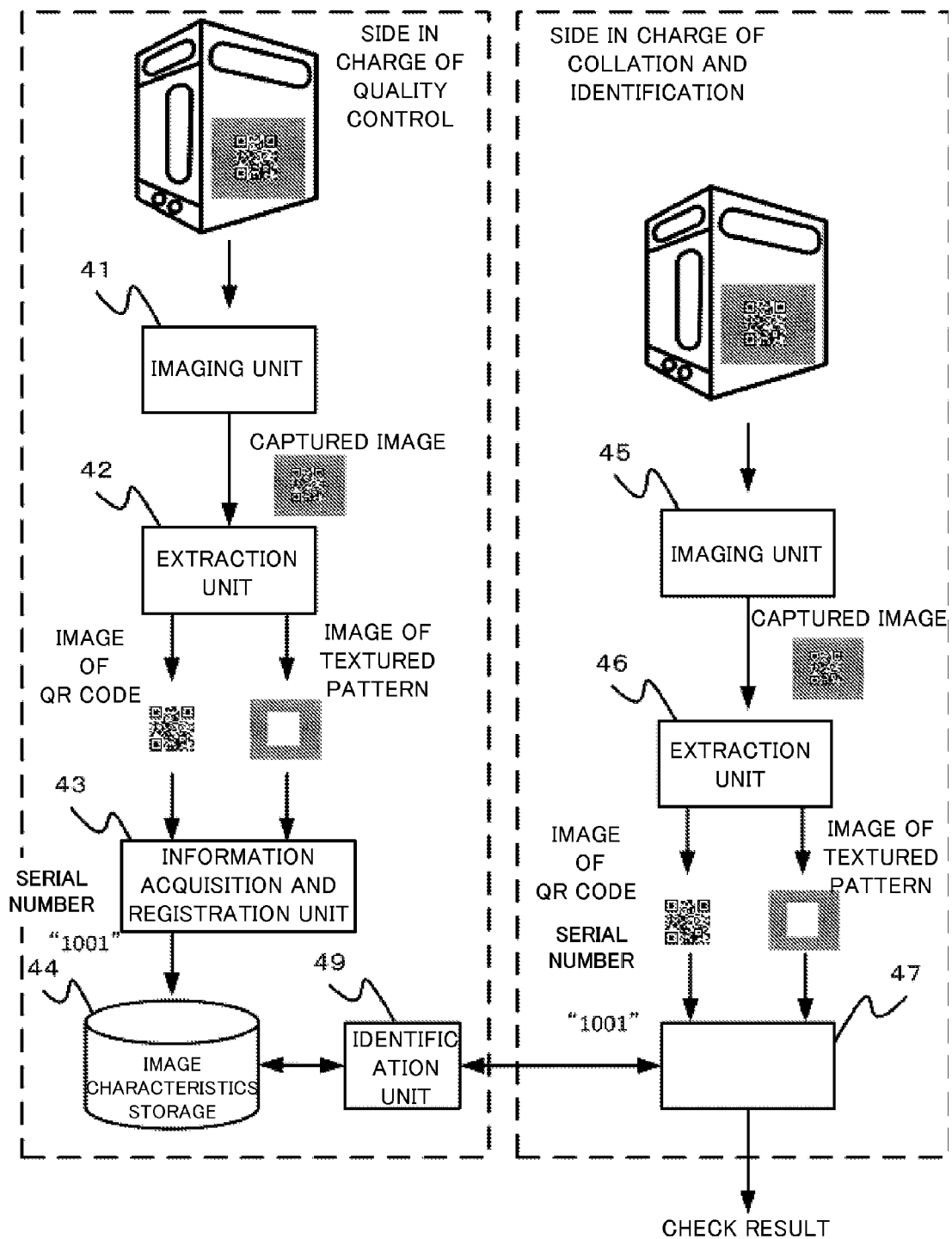
FIG. 4 is a block diagram of example 1 according to the present invention.

FIG. 4 is a block diagram of an identification system according to example 1.

An imaging unit 41 is a tool to be used by a side in charge of manufacturing a PC terminal (manufacture, etc. of a PC terminal) or a tool to be used by a side of an administrator who performs quality control of a PC terminal. The manufacturer, etc., uses the imaging unit 41 to capture an image of a QR code of a PC case attached to a PC terminal.

Meanwhile, the imaging unit 41 captures an image under the above described predetermined image capturing conditions.

An extraction unit 42 extracts an image of the QR code and an image of a textured pattern from the image captured by the imaging unit 41. Extraction of the image of the QR code and the image of the textured pattern is performed in a manner similar to the case of the first embodiment.

An information acquisition and registration unit 43 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 42, thereby obtaining a serial number. The information acquisition and registration unit 43 obtains image characteristics of the image of the satin finished surface extracted by the extraction unit 42. Then, the information acquisition and registration unit 43 registers the serial number as an extraction result and the image characteristics of the satin finished surface in the image characteristics database 44 after they are associated with each other. The image characteristics database 44 is also a tool to be used by the side of the manufacturer of a PC terminal or the side of the administrator who performs quality control of a PC terminal. As shown in FIG. 5, the image characteristics database 44 stores serial numbers, image characteristics of textured patterns in collation areas of PC cases, each collation area being provided with a serial number printed thereon, and management information on PC terminals, each PC terminal including PC cases as its component, after they are correspondingly associated with each other. Meanwhile, the management information is a concept including not only identification information of a part, a product, or a product including the part attached thereto but also production information such as a production site, a brand, and a production date of a part or a product and management information of a part or a product such as distribution information, etc., e.g., a product name, a destination, a ship date, etc. of a product using the part.

As described above, if the image characteristics of the textured pattern of the part being associated with the management information on the part, the product, or the product including the part attached thereto, it becomes possible to perform acquisition of history information on the identified PC case (part) and identification of a PC terminal including the PC case as its component (product including the part attached thereto).

An imaging unit 45, an extraction unit 46, and an information acquisition unit 47 are tools to be used by a side in charge of matching a PC terminal such as a testing department, a destination, a shop, and a purchaser of the PC terminal.

The imaging unit 45 has a structure similar to that of the imaging unit 41. More specifically, the imaging unit 45 captures an image of a QR code of a PC case of a PC terminal to be identified.

The extraction unit 46 has a structure similar to that of the extraction unit 42. More specifically, the extraction unit 46 extracts an image of the QR code and an image of a textured pattern from the image captured by the imaging unit 45.

The information acquisition unit 47 acquires information on the PC case and the PC terminal from the image of the QR code extracted by the extraction unit 46. In the present example, the information acquisition unit 47 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 46, thereby acquiring a serial number. Further, the information acquisition unit 47 acquires image characteristics from the image of the textured pattern extracted by the extraction unit 46. Then, the information acquisition unit 47 sends the serial number and the image characteristics extracted from the image of the satin finished surface to an identification unit 49 on the side of an administrator. The information acquisition unit 47 subsequently receives a check result thereof to output it.

The identification unit 49 collates the serial number received from the side of the collator with textured patterns. Then, the identification unit 49 sends a check result thereof. More specifically, the identification unit 49 collates the received serial number with serial numbers registered in the image characteristics database 44. If there is a matching number, image characteristics of the textured pattern associated with the serial number is collated with the received image characteristics. Then, the identification unit 49 returns a check result thereof. In a case where thus collated serial number and the image characteristics of the textured pattern have been associated with each other to be registered in the image characteristics database 44, the PC case of the PC terminal to be collated is determined as a genuine PC case registered in the image characteristics database 44. Based on the management information associated with the image characteristics of the satin finished surface, the PC terminal having the PC case as its component can be identified.

Meanwhile, the above mentioned imaging unit, image characteristics extraction unit, image characteristics database, extraction unit, information acquisition unit, and identification unit may be independent from each other but are to be connected to each other via network. Alternatively, some of them may be formed into one piece.

As described above, according to the present embodiment, an image of an n-dimensional symbol attached to a part or a product and an image of a textured pattern are read out at the same time, and therefore acquisition of information on the part or the product and identification of the part or the product can be performed efficiently. Further, in example 1, it is possible to store a QR code as identification information of a part or a product and image characteristics of a textured pattern formed on a part or a product in a manner they are corresponded to each other and, under such conditions, to collate the image characteristics of the textured pattern stored after it is associated with the identification information of the QR code acquired from the captured image with the textured pattern acquired from the captured image. This enables certification and identification of the part or the product.

Example 2

An example 2 according to the present invention will be described below.

Figure 6:
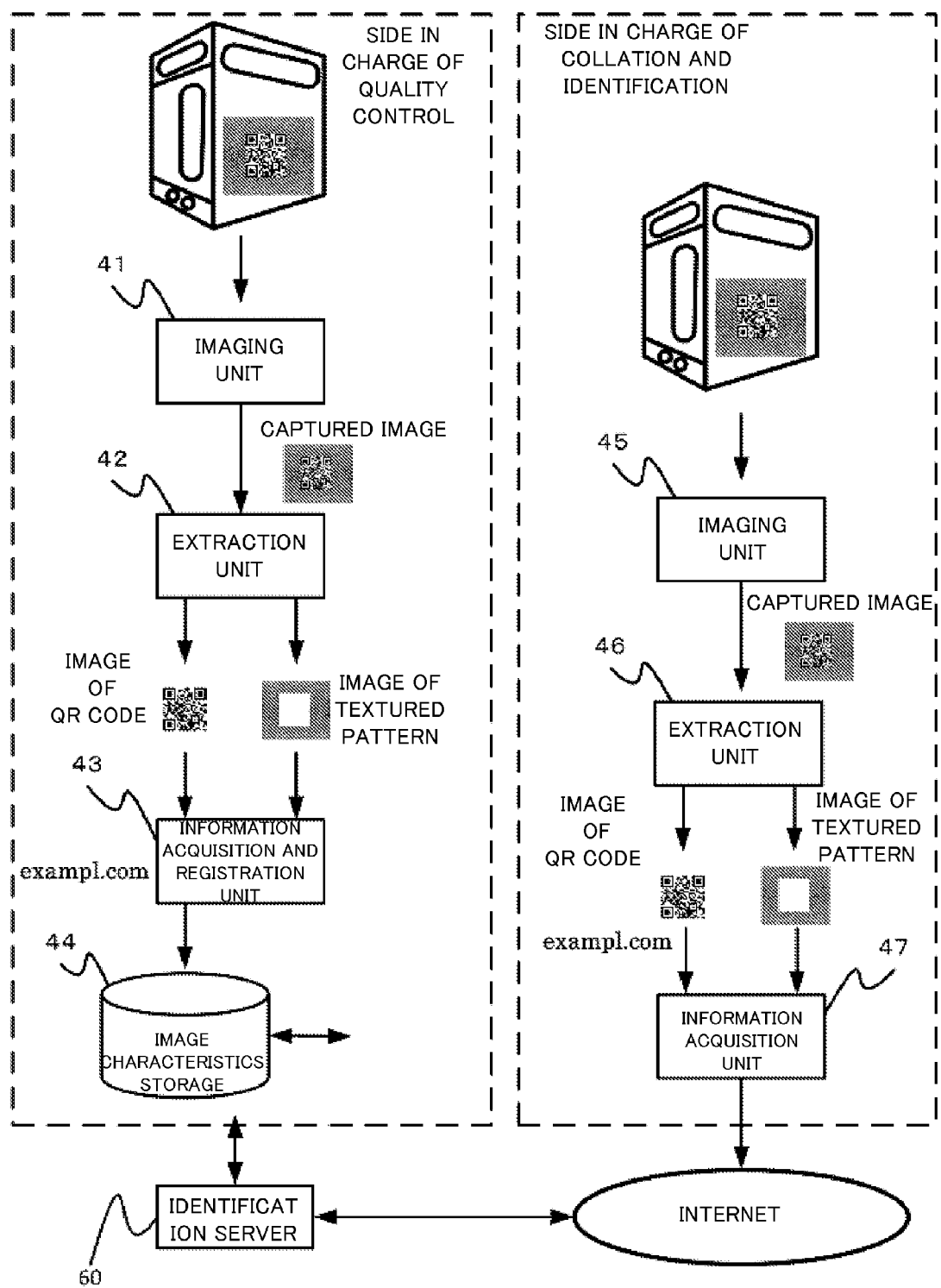
FIG. 6 is a block diagram of an embodiment of example 2 according to the present invention.

FIG. 6 is a block diagram of an identification system according to example 2.

In example 2, information indicated by the QR code is an URL (Uniform Resource Locator). The URL indicates an address of an identification site of a PC terminal.

An imaging unit 51 is a tool to be used by a side in charge of manufacturing of a PC terminal (manufacturer, etc. of a PC terminal) or a side in charge of performing quality control of a PC terminal. A manufacturer, etc. uses the imaging unit 51 to capture an image of a QR code of a PC case as one of components of a PC terminal. The imaging unit 51 has a structure similar to that of the imaging unit 41 of example 1.

An extraction unit 52 extracts an image of the QR code and an image of a stain pattern from the image captured by the imaging unit 51. Extraction processing for extracting the image of the QR code and the image of the stain pattern is similar to that of the first embodiment.

A registration unit 53 extracts image characteristics of the image of the satin finished surface extracted by the extraction unit 52 to register it in an image characteristics database 54. The image characteristics database 54 is a tool to be used by a side of a manufacturer of a PC terminal and a side of an administrator who performs quality control of a PC terminal. The image characteristics database 54 stores image characteristics of textured patterns of QR codes and management information of PC terminals, each PC terminal having a PC case as its component provided with a QR code printed thereon, after they are correspondingly associated with each other. Meanwhile, the management information is a concept including not only identification information of a part, a product, or a product including the part attached thereto but also production information such as a production site, a brand, and a production date of a part or a product and management information of a part or a product such as distribution information, etc., e.g., a product name, a destination, a ship date, etc. of a product using the part. Association between the image characteristics of the textured pattern of the part and the management information on the part, the product, or the product to which the part is attached, as described above, enables acquisition of history information on identified PC case (part) and identification of a PC terminal including the PC case as its component (product provided with the part attached thereto).

A matching device 59 is a tool to be used by a side in charge of collation and identification of a PC terminal, e.g., an inspection department, a destination, a shop, a purchaser, etc. of the PC terminal. The collating device 59 includes an imaging unit 55, an extraction unit 56, and an information acquisition unit 57.

The imaging unit 55 has a structure similar to that of the imaging unit 51. The imaging unit 55 captures an image of a QR code of a PC case as one of components of a PC terminal to be identified.

The extraction unit 56 has a structure similar to that of the extraction unit 52. The extraction unit 56 extracts an image of the QR code and an image of a stain pattern from the image captured by the imaging unit 55.

The information acquisition unit 57 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 56. Accordingly, the information acquisition unit 57 obtains an URL. Subsequently, the information acquisition unit 57 extracts image characteristics from the image of the textured pattern extracted by the extraction unit 56. Then, the information acquisition unit 57 accesses a site of the acquired URL via internet to transmit data of the image characteristics extracted from the image of the satin finished surface in order to request identification of the PC terminal. The information acquisition unit 57 receives a check result thereof in response to the request, followed by outputting it.

An identification server 60 is a Web server which provides a PC terminal identification service on the internet. The identification server 60 is connected to the image characteristics database 54. When the identification server 60 receives data of the image characteristics of the satin finished surface together with the request for identification, the identification server 60 collates the received image characteristics of the image of the satin finished surface with image characteristics of images of satin finished surfaces registered in the image characteristics database 54 to return a check result thereof to the request source. More specifically, in a case where the received image characteristics of the stain pattern match any one of the registered image characteristics, the identification server 60 determines that the PC case including the textured pattern formed thereon, i.e., the PC case of the request source, is a genuine PC case registered in the image characteristics database 54. Then, the identification server 60 transmits the management information associated with the image characteristics of the satin finished surface to the request source. This enables the request source to identify a PC terminal having the PC case as its component.

As described above, according to the present embodiment, it is possible to read an image of a QR code attached to a part or a product and an image of a textured pattern at the same time. This ensures effective acquisition of information on a part or a product and identification of a part or a product. Further, in example 2, the QR code is an URL indicating an identification site for identifying a part or a product by using textured patterns. Transmission of the image characteristics of the textured pattern obtained from the captured image to the URL obtained from the image of the QR code of the captured image enables certification and identification of a part or a product.

Second Embodiment

A second embodiment of the present invention will be described below.

The second embodiment is almost identical to the above described first embodiment, except that, after a part or a product is subjected to identification, image characteristics of a textured pattern to be identified are associated with an identification result thereof to be stored together.

Figure 7:
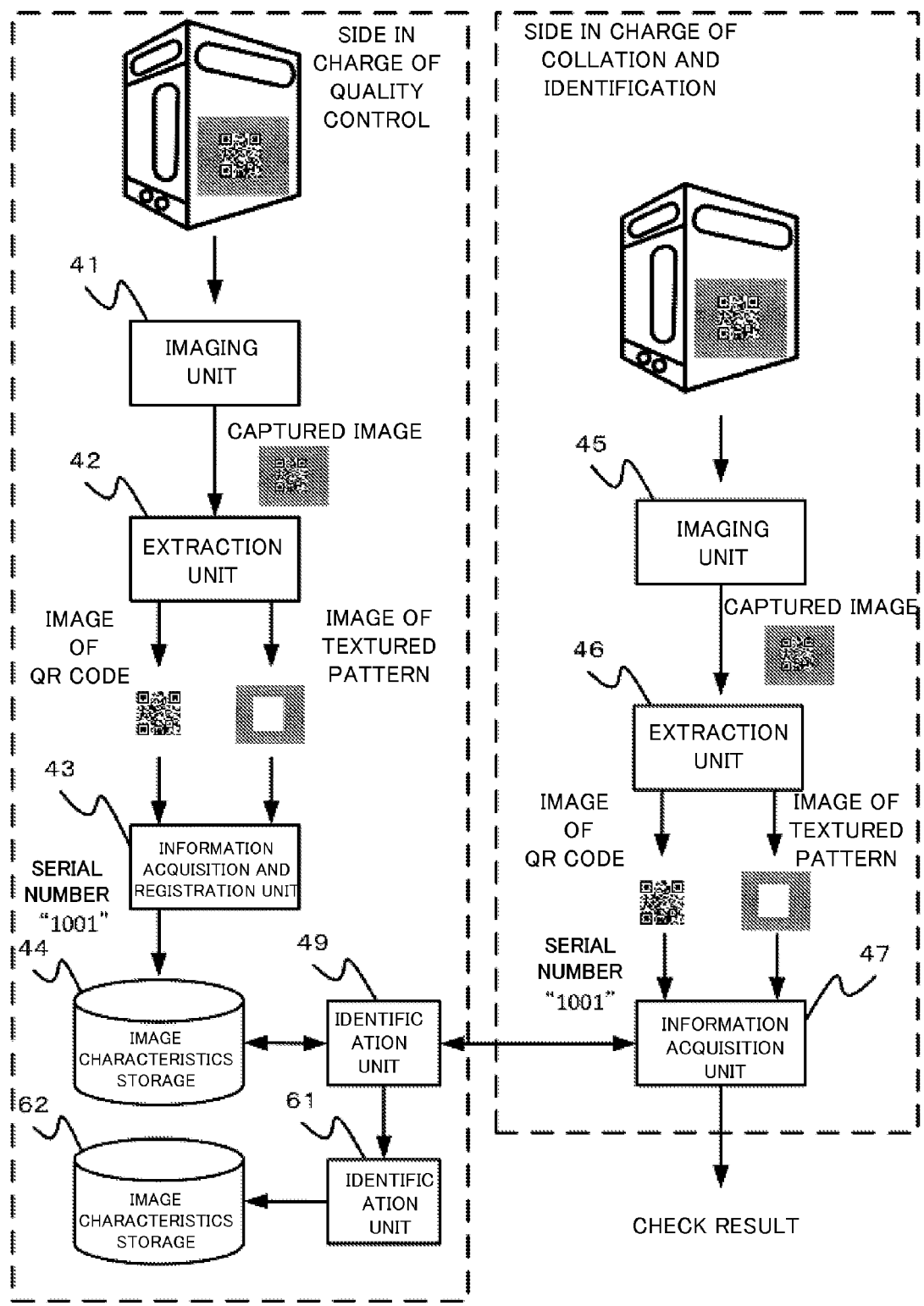
FIG. 7 is a block diagram of a second embodiment according to the present invention.

FIG. 7 is a block diagram of the second embodiment. An identification system of the present embodiment includes, in addition to the above described structure of the first embodiment, an identification information registration unit 61 and an identification information database 62. The identification information registration unit 61 receives image characteristics of a satin finished surface after being checked against the image characteristics database 44 and information on a check result thereof from the identification unit 49, associates them with each other, and registers the associated information in the identification information database 62. Alternatively, the identification information registration unit 61 may read out product information, management information, etc. which have been registered in the image characteristics database 44 after they are associated with each other and register them in the identification information database 62 after they are associated with the image characteristics of the satin finished surface in a case where the image characteristics to be identified are registered in the image characteristics database 44.

Further, the fourth embodiment may be provided with a statistical processing unit which performs, by using the identification information database 62 which accumulatively stores the image characteristics of thus identified satin finished surface, the check result information, etc., statistical processing of information on a predetermined part or product to output states of distribution and sale of the product and the use of the product. Still further, the fourth embodiment may be provided with an analyzer capable of statistically processing information of cases in which collation was failed and analyzing a state of occurrence of counterfeits in a case where check results or certification results of genuineness/spuriousness and checked locations of the products are stored as check result information.

Third Embodiment

A third embodiment according to the present invention will be described below.

The third embodiment is directed to a registration apparatus including textured pattern forming means, image capturing means, extracting means, and registering means. The textured pattern forming means forms a textured pattern having granularity smaller than a short side of a cell of an n-dimensional symbol on a part, a product, or a product including the part as its component to which the n-dimensional symbol which indicates information on the part or the products is attached. The image capturing means captures an image including at least the n-dimensional symbol and the formed textured pattern under specific image capturing conditions. The extracting means extracts an image of the textured pattern from the captured image. The registering means registers identification information for identifying the part or the products and image characteristics of the extracted image of the textured pattern in storing means after they are associated with each other.

Figure 8:
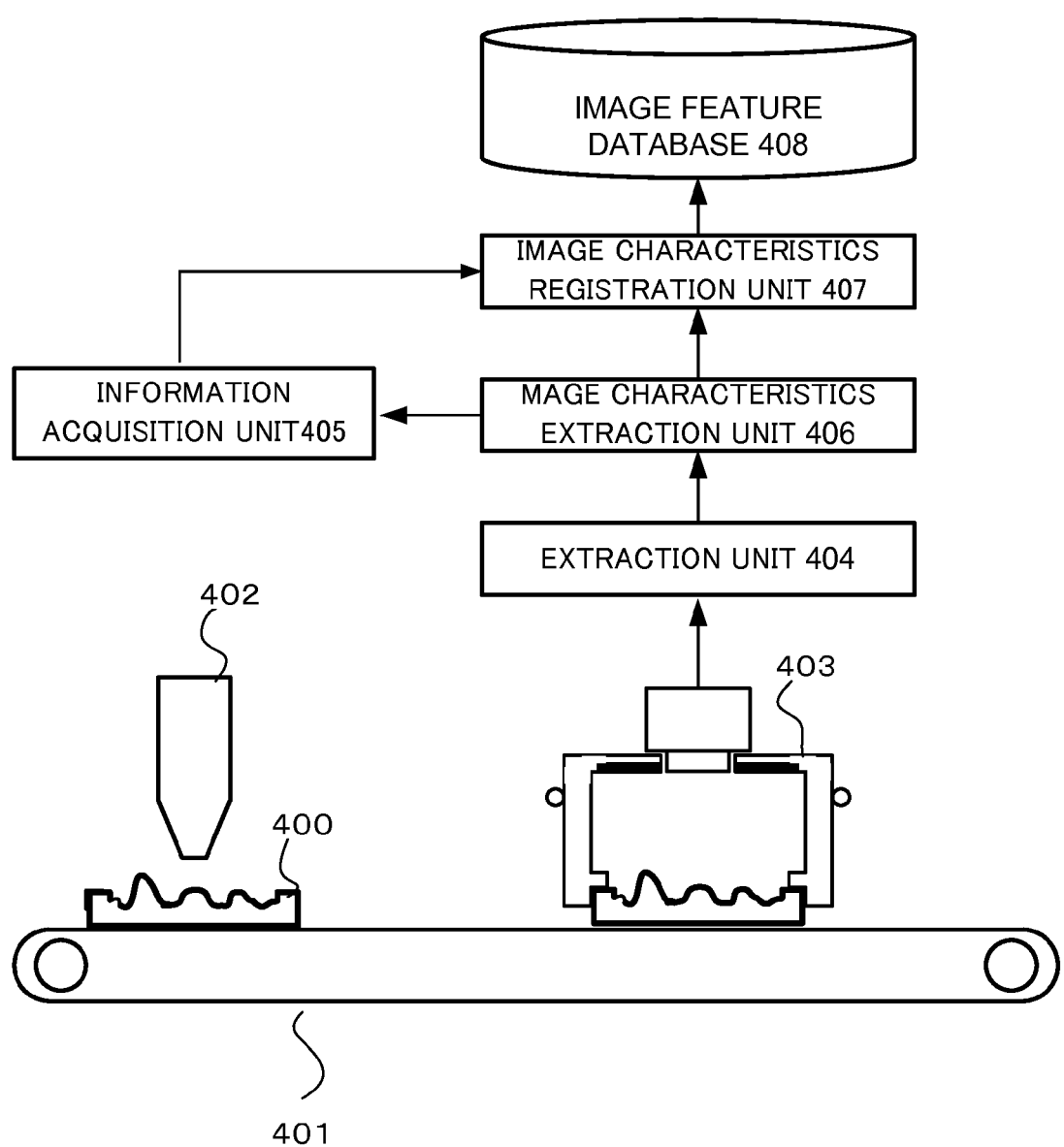
FIG. 8 is a block diagram of a third embodiment according to the present invention.

FIG. 8 is a block diagram of a registration apparatus of a third embodiment.

The registration apparatus of the third embodiment includes a belt conveyer 401, a textured pattern forming unit 402, an imaging unit 403, an extraction unit 404, an information acquisition unit 405, an image characteristics extraction unit 406, an image characteristics registration unit 407, and an image characteristics database 408. The belt conveyer 401 conveys a part 400. The textured pattern forming unit 402 forms a textured pattern on the part 400. The imaging unit 403 captures an image of the textured pattern of a QR code of the part 400 under specific image capturing conditions. The extraction unit 404 extracts an image of the QR code and the image of the textured pattern from the image captured by the imaging unit 403. The information acquisition unit 405 acquires identification information from the image of the QR code. The image characteristics extraction unit 406 extracts image characteristics from the image of the textured pattern. The image characteristics registration unit 407 registers the extracted image characteristics and identification information on the part in the image characteristics database 408 after they are associated with each other.

In the textured pattern forming unit 402, at least a portion of the QR code attached to the part is provided with a satin finished surface which includes random convexes/concaves. The resulting textured pattern surface is used for the purpose of collation. For example, the satin finished surface can be provided by means of sand blasting or etching, blast plating, etc. However, any other method can also be employed. Further, it is preferable that a satin finished surface is provided on a collation area of a skeleton part of the QR code in a manner sharply defining the collation area. However, a small positional deviation, etc. can be tolerated since the positional deviation can be amended by the below mentioned step of image processing. Therefore, it is sufficient to form the textured pattern at least within the collation area.

The imaging unit 403 captures an image of the QR code of the part 400 on which a textured pattern is formed, while the part 400 is carried by the belt conveyer 401, by the method performed under the image capturing conditions described in the first embodiment. Subsequently, the imaging unit 403 outputs the captured image to the extraction unit 404.

The extraction unit 404 extracts the image of the QR code and the image of the textured pattern from the image captured by the imaging unit 403.

The information acquisition unit 405 acquires identification information from the image of the QR code extracted by the extraction unit 404.

The image characteristics extraction unit 406 extracts image characteristics from the image of the textured pattern obtained by the extraction unit 404. Extraction of the image characteristics is performed with respect to the image captured by the imaging unit 403 by using an extraction technology for extracting image characteristics of a finger print. More specifically, a luminance value and a feature point of an image, an inflection point of a line of a binarized image, an interunit point, an inter-edge point, and a central point of an image are extracted by the extraction technology. Meanwhile, if necessary, the extraction of the image characteristics is performed, as described above, after normalization by using the QR code.

The image characteristics registration unit 407 registers the image characteristics of the part 400 extracted by the image characteristics extraction unit 406 and identification information of the part 400 indicated by the QR code in the image characteristics extraction unit 406 after they are associated with each other.

The registration apparatus as described above can automatically perform processing from formation of satin finished surface for the purpose of identification to registration of image characteristics.

Hereinbefore, the embodiments of the present invention are described. As apparent from the above description, it is possible to configure the image characteristics extraction unit, the identification unit, etc. by hardware. Alternatively, it is possible to achieve functions of the image characteristics extraction unit, the identification unit, etc. by using a computer program. In this case, functions and operations similar to those of the above described embodiments can be realized by a processor operated under operation of a program stored in a program memory.

Further, a portion of or whole of the above described embodiments can be described as, but not limited to, the following supplementary notes.

Supplementary Note 1

An information acquisition and identification system including image characteristics storage means storing image characteristics of textured patterns formed on component or products, extracting means extracting an image of an n-dimensional (n: natural number) symbol and an image of a textured pattern from an image including at least the n-dimensional symbol for displaying information on a part, a product, or a product including the part as its component and a textured pattern formed on the part or the products, acquiring means acquiring information on the part or the products from the extracted image of the n-dimensional symbol, and identifying means identifying the part, the product, or the product including the part as its component by matching image characteristics of the extracted image of the textured pattern with image characteristics stored in the image characteristics storage means.

Supplementary Note 2

The information acquisition and identification system according to supplementary note 1, wherein the textured pattern is formed in order to identify the part, the product, or the product including the part as its component.

Supplementary Note 3

The information acquisition and identification system according to supplementary note 1 or supplementary note 2, wherein the textured pattern is formed on a portion at a position determined by the n-dimensional symbol.

Supplementary Note 4

An information acquisition and identification system according to any one of supplementary note 1 to supplementary note 3, wherein granularity of the textured pattern is smaller than a short side of a cell of the n-dimensional symbol.

Supplementary Note 5

The information acquisition and identification system according to any one of claim 1 to claim 3, wherein the textured pattern is formed on an area other than the n-dimensional symbol.

Supplementary Note 6

The information acquisition and identification system according to supplementary note 4, wherein the textured pattern is provided on each die with predetermined granularity in order to identify a die used in manufacturing, and wherein each individual is processed, in order to identify the each individual manufactured by the same die, with granularity smaller than the granularity at the time of processing the each die.

Supplementary Note 7

The information acquisition and identification system according to any one of supplementary note 1 to supplementary note 6, further including forming means forming the textured pattern in order to identify the part, the product, or the product including the part as its component, and image capturing means capturing an image of the formed portion.

Supplementary Note 8

The information acquisition and identification system according to any one of supplementary note 1 to supplementary note 7, wherein the extracting means extracts the image of the textured pattern by removing a high frequency component corresponding to granularity of a satin finished surface from the captured image and taking a difference between the captured image and an image captured after the high frequency component is removed.

Supplementary Note 9

The information acquisition and identification system according to any one of supplementary note 1 to supplementary note 8, wherein the captured image and images of image characteristics stored in the image characteristics storage means are to be captured under the same lighting conditions.

Supplementary Note 10

The information acquisition and identification system according to supplementary note 9, wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

Supplementary Note 11

The information acquisition and identification system according to any one of supplementary note 1 to supplementary note 10, wherein the extracting means normalizes the captured image by using the n-dimensional symbol.

Supplementary Note 12

The information acquisition and identification system according to any one of supplementary note 1 to supplementary note 11, wherein the n-dimensional symbol indicates identification information for identifying an origin or each individual of the part, the product, or the product including the part as its component, wherein the image characteristics storage means stores the identification information and image characteristics of the textured pattern formed on the part, the product, or the product including the part as its component after they are associated with each other, and wherein the identifying means identifies the part, the product, or the product including the part as its component of a captured image by matching the image characteristics of the textured pattern corresponding to the identification information of the n-dimensional symbol acquired from the captured image with the image characteristics of the textured pattern extracted from the captured image.

Supplementary Note 13

The information acquisition and identification system according to any one of supplementary note 1 to supplementary note 12, wherein the image characteristics storage means and the identifying means are provided in an identification server, wherein the n-dimensional symbol indicates a URL of the identification server, wherein the acquiring means acquires the URL of the identification server from the extracted image of the n-dimensional symbol and transmits the captured image or the extracted image of the textured pattern to the identification server, and wherein the identification server identifies the part, the product, or the product including the part as its component by using the captured image or the extracted image of the textured pattern.

Supplementary Note 14

The information acquisition and identification system according to any one of supplementary note 1 to supplementary note 13, wherein the n-dimensional symbol indicates at least one of a serial number, a name of manufacturer, a name of producer, a brand name, a product name, a product number, a rod number, and a URL.

Supplementary Note 15

A processing system including textured pattern forming means forming a textured pattern for identifying a part, a product, or a product including the part as its component on a part, a product, or a product including the part as its component to which an n-dimensional symbol displaying information on the part or the products is attached.

Supplementary Note 16

The processing system according to supplementary note 15, wherein the textured pattern forming means forms a textured pattern having granularity smaller than a short side of a cell of the n-dimensional symbol on the part, the product, or the product including the part as its component to which the n-dimensional symbol which indicates information on the part or the products is attached.

Supplementary Note 17

The processing system according to supplementary note 15 or supplementary note 16, wherein the textured pattern forming means forms the textured pattern on a portion at a position determined by the n-dimensional symbol.

Supplementary Note 18

The processing system according to supplementary note 17, wherein the textured pattern forming means forms the textured pattern in a manner that granularity of the textured pattern is smaller than a short side of a cell of the n-dimensional symbol.

Supplementary Note 19

The processing system according to any one of supplementary note 15 to supplementary note 18, wherein the textured pattern forming means forms the textured pattern on an area other than the n-dimensional symbol.

Supplementary Note 20

The processing system according to supplementary note 19, wherein the textured pattern forming means provides the textured pattern on each die with predetermined granularity in order to identify a die used in manufacturing, and wherein each individual is processed, in order to identify the each individual manufactured by the same die, with granularity smaller than the granularity at the time of processing the each die.

Supplementary Note 21

A registration system including image capturing means capturing an image including at least an n-dimensional symbol which indicates information on a part, a product, or a product including the part as its component and a textured pattern having granularity smaller than a short side of a cell of the n-dimensional symbol, the textured pattern being formed on the part or the products to which the n-dimensional symbol is attached, under specific image capturing conditions, extracting means extracting an image of the textured pattern from the captured image, and registering means registering in storing means identification information for identifying the part or the products and image characteristics of the extracted image of the textured pattern after they are associated with each other.

Supplementary Note 22

A registration system including textured pattern forming means forming a textured pattern having granularity smaller than a short side of a cell of an n-dimensional symbol on a part, a product, or a product including the part as its component to which the n-dimensional symbol indicating information on the part or the products is attached, image capturing means capturing an image including at least the n-dimensional symbol and the formed textured pattern under specific image capturing conditions, extracting means extracting the image of the textured pattern from the captured image, and registering means registering in storing means identification information for identifying the part or the products and image characteristics of the extracted image of the textured pattern after they are associated with each other.

Supplementary Note 23

The registration system according to supplementary note 21 or supplementary note 22, wherein the textured pattern is provided on each die with predetermined granularity in order to identify a die used in manufacturing, and wherein each individual is processed, in order to identify the each individual manufactured by the same die, with granularity smaller than the granularity at the time of processing the each die.

Supplementary Note 24

The registration system according to any one of supplementary note 21 to supplementary note 23, wherein the textured pattern is formed in order to identify the part, the product, or the product including the part as its component.

Supplementary Note 25

The registration system according to any one of supplementary note 21 to supplementary note 24,
wherein the textured pattern is formed on an area at a position determined by the n-dimensional symbol.

Supplementary Note 26

A matching device including
extracting means extracting an image of an n-dimensional symbol and an image of a textured pattern from an image including at least the n-dimensional symbol for displaying information on a part, a product, or a product including the part as its component and the textured pattern formed on the part or the products,
acquiring means acquiring information on the part or the products from the extracted image of the n-dimensional symbol, and
acquiring and outputting means acquiring and outputting a check result obtained by checking the extracted image of the textured pattern against a database which stores image characteristics of textured patterns formed on component or products.

Supplementary Note 27

The matching device according to supplementary note 26,
wherein the textured pattern is formed in order to identify a part, a product, or a product including the part as its component.

Supplementary Note 28

The matching device according to supplementary note 26 or supplementary note 27,
wherein the textured pattern is formed on a portion at a position determined by the n-dimensional symbol.

Supplementary Note 29

The matching device according to any one of supplementary note 26 to supplementary note 28,
wherein granularity of the textured pattern is smaller than a short side of a cell of the n-dimensional symbol.

Supplementary Note 30

The matching device according to any one of supplementary note 26 to supplementary note 28,
wherein the textured pattern is formed on an area other than the n-dimensional symbol.

Supplementary Note 31

The matching device according to supplementary note 30,
wherein the textured pattern is provided on each die with predetermined granularity in order to identify a die used in manufacturing, and
wherein each individual is processed, in order to identify the each individual manufactured by the same die, with granularity smaller than the granularity at the time of processing the each die.

Supplementary Note 32

The matching device according to any one of supplementary note 26 to supplementary note 31,
wherein the extracting means extracts an image of the textured pattern by removing a high frequency component corresponding to granularity of a textured pattern from the captured image to take a difference between the captured image and an image after the high frequency component is removed.

Supplementary Note 33

The matching device according to any one of supplementary note 26 to supplementary note 32,
wherein the captured image and images of image characteristics stored in the database are to be captured under the same lighting conditions.

Supplementary Note 34

The matching device according to supplementary note 33,
wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

Supplementary Note 35

The matching device according to any one of supplementary note 26 to supplementary note 34,
wherein the extracting means normalizes the captured image by using the image of the n-dimensional symbol.

Supplementary Note 36

The matching device according to any one of supplementary note 26 to supplementary note 35,
wherein the n-dimensional symbol indicates at least one of a serial number, a name of manufacturer, a name of producer, a brand name, a product name, a product number, a rod number, and a URL.

Supplementary Note 37

An information acquisition and identification method including
extracting an image of an n-dimensional symbol and an image of a textured pattern from an image including at least the n-dimensional symbol for displaying information on a part, a product, or a product including the part as its component and the textured pattern formed on the part or the products,
acquiring information on the part or the products from the extracted image of the n-dimensional symbol, and
identifying the part or a product including the product as its component by using image characteristics of the extracted image of the textured pattern.

Supplementary Note 38

The information acquisition and identification method according to supplementary note 37, wherein the textured pattern is formed in order to identify the part, the product, or the product including the part as its component.

Supplementary Note 39

The information acquisition and identification method according to supplementary note 37 or supplementary note 38,
wherein the textured pattern is formed on an area at a position determined by the n-dimensional symbol.

Supplementary Note 40

The information acquisition and identification method according to supplementary note 39,
wherein granularity of the textured pattern is smaller than a short side of a cell of the n-dimensional symbol.

Supplementary Note 41

The information acquisition and identification method according to any one of supplementary note 37 to supplementary note 39,
wherein the textured pattern is formed on an area other than the n-dimensional symbol.

Supplementary Note 42

The information acquisition and identification method according to supplementary note 37 to supplementary note 41,
wherein the textured pattern is provided on each die with predetermined granularity in order to identify a die used in manufacturing, and
wherein each individual is processed, in order to identify the each individual manufactured by the same die, with granularity smaller than the granularity at the time of processing the each die.

Supplementary Note 43

The information acquisition and identification method according to any one of supplementary note 37 to supplementary note 42,
wherein the textured pattern is formed in order to identify the part, the product, or the product including the part as its component, and
wherein an image of the formed portion is captured.

Supplementary Note 44

The information acquisition and identification method according to any one of supplementary note 37 to supplementary note 43,
wherein a high frequency component corresponding to granularity of a satin finished surface is removed from the captured image, and
wherein the image of the textured pattern is obtained by taking a difference between the captured image and an image captured after removing the high frequency component.

Supplementary Note 45

The information acquisition and identification method according to any one of supplementary note 37 to supplementary note 44,
wherein the captured image is captured under lighting conditions identical to that when capturing identification images preliminary stored for identification of the captured image.

Supplementary Note 46

The information acquisition and identification method according to supplementary note 45,
wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

Supplementary Note 47

The information acquisition and identification method according to any one of supplementary note 37 to supplementary note 46,
wherein the image of the n-dimensional symbol is used to normalize the captured image.

Supplementary Note 48

The information acquisition and identification method according to any one of supplementary note 37 to supplementary note 47,
wherein the n-dimensional symbol indicates identification information for identifying an origin or an individual of the part, the product, or the product including the part as its component, wherein correspondency between the identification information indicated by the n-dimensional symbol and image characteristics of the textured pattern formed on the part or the products is stored, and
wherein, based on the correspondency, the part, the product, or the product including the part as its component of the captured image is identified by matching the image characteristics of the textured pattern corresponding to the identification information of the n-dimensional symbol obtained from the captured image with the image characteristics of the textured pattern extracted from the captured image.

Supplementary Note 49

The information acquisition and identification method according to any one of supplementary note 37 to supplementary note 48,
wherein the n-dimensional symbol indicates a URL of an identification site for identifying an origin or an individual of the part, the product, or the product including the part as its component by using the textured pattern,
wherein the URL of the identification site is obtained from the n-dimensional symbol of the captured image,
wherein the captured image or the extracted image of the textured pattern is sent to the identification site, and
wherein, in the identification site, the part, the product, or the product including the part as its component is identified by using the captured image or the extracted image of the textured pattern.

Supplementary Note 50

The information acquisition and identification method according to any one of supplementary note 37 to supplementary note 48,
wherein the n-dimensional symbol indicates at least one of a serial number, a name of manufacturer, a name of producer, a brand name, a product name, a product number, a rod number, and a URL.

Supplementary Note 51

A program causing a computer to perform
extraction processing extracting an image of an n-dimensional symbol and an image of a textured pattern from an image including at least the n-dimensional symbol for displaying information on a part, a product, or a product including the part as its component and the textured pattern formed on the part or the products,
acquisition processing acquiring information on the part or the products from the extracted image of the n-dimensional symbol, and
acquisition and output processing acquiring and outputting a check result obtained by checking the extracted image of the textured pattern against a database which stores image characteristics of the formed textured pattern.

Supplementary Note 52

A program according to supplementary note 51,
wherein the textured pattern is formed in order to identify the part, the product, or the product including the part as its component.

Supplementary Note 53

The program according to supplementary note 51 or supplementary note 52,
wherein the textured pattern is formed on an area at a position determined by the n-dimensional symbol.

Supplementary Note 54

The program according to any one of supplementary note 51 to supplementary note 53,
wherein granularity of the textured pattern is smaller than a short side of a cell of the n-dimensional symbol.

Supplementary Note 55

The program according to any one of supplementary note 51 to supplementary note 54,
wherein the textured pattern is formed on an area other than the n-dimensional symbol.

Supplementary Note 56

The program according to supplementary note 55,
wherein the textured pattern is provided on each die with predetermined granularity in order to identify a die used in manufacturing, and
wherein each individual is processed, in order to identify the each individual manufactured by the same die, with granularity smaller than the granularity at the time of processing the each die.

Supplementary Note 57

The program according to any one of supplementary note 51 to supplementary note 56,
wherein the extraction processing extracts an image of the textured pattern by removing a high frequency component corresponding to granularity of a satin finished surface from the captured image to take a difference between the captured image and an image after the high frequency component is removed.

Supplementary Note 58

The program according to any one of supplementary note 51 to supplementary note 57,
wherein the captured image and images of image characteristics stored in the database are to be captured under the same lighting conditions.

Supplementary Note 59

The program according to supplementary note 58,
wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

Supplementary Note 60

The program according to any one of supplementary note 51 to supplementary note 59,
wherein the extraction processing normalizes the captured image by using the image of the n-dimensional symbol.

Supplementary Note 61

The program according to any one of supplementary note 51 to supplementary note 60,
wherein the n-dimensional symbol indicates at least one of a serial number, a name of manufacturer, a name of producer, a brand name, a product name, a product number, a rod number, and a URL.

Although the present invention has been fully described by way of the examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

This application claims the benefit of Japanese Application No. 2013-078802, filed Apr. 4, 2013, the disclosure of which is hereby incorporated by reference.

REFERENCE CHARACTER LIST

10 image characteristics storage unit
11 extraction unit
12 information acquisition unit
13 identification unit
41, 45 imaging unit
42, 46 extraction unit
43 information acquisition and registration unit
44, 54 image characteristics database
47, 57 information acquisition unit
49 identification unit 51, 55 imaging unit
52, 56 extraction unit
53 registration unit
60 identification server

What is claimed is:

1. An information acquisition and identification system comprising:
    an image characteristics storage configured to store image characteristics of textured patterns formed over an n-dimensional symbol displaying information on a part, a product, or a product including the part as its component on component or products, wherein n is a natural number; and
    a processor programmed to:
        extract an image of the n-dimensional symbol and an image of a textured pattern over the n-dimensional symbol from an image including at least the n-dimensional symbol and a textured pattern formed on the part or the product;
        acquire information on the part or the products from the extracted image of the n-dimensional symbol;
        identify the part, the product, or the product including the part as its component by matching image characteristics of the extracted image of the textured pattern with image characteristics stored in the image characteristics storage; and
        extract the image of the textured pattern by removing a high frequency component corresponding to granularity of a satin finished surface from a captured image and taking a difference between the captured image and an image captured after the high frequency component is removed.

2. The information acquisition and identification system according to claim 1,
    wherein the textured pattern is formed in order to identify the part, the product, or the product including the part as its component.

3. The information acquisition and identification system according to claim 1,
    wherein the textured pattern is formed on a portion at a position determined by the n-dimensional symbol.

4. An information acquisition and identification system according to claim 1,
    wherein granularity of the textured pattern is smaller than a short side of a cell of the n-dimensional symbol.

5. The information acquisition and identification system according to claim 4,
    wherein the textured pattern is provided on each of at least one die with predetermined granularity in order to identify a die used in manufacturing; and
    wherein each individual is processed, in order to identify the each individual manufactured by a same die, with granularity smaller than the granularity at the time of processing the each of the at least one die.

6. The information acquisition and identification system according to claim 1,
    wherein the processor is further programmed to:
        form the textured pattern in order to identify the part, the product, or the product including the part as its component; and
        capture an image of the formed portion.

7. The information acquisition and identification system according to claim 1,
    wherein the captured image and images of image characteristics stored in the image characteristics storage means are to be captured under a same lighting conditions.

8. The information acquisition and identification system according to claim 7,
    wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

9. The information acquisition and identification system according to claim 1,
    wherein the processor is further programmed to:
        normalize the captured image by using the n-dimensional symbol.

10. The information acquisition and identification system according to claim 1,
    wherein the n-dimensional symbol indicates identification information for identifying an origin or each individual of the part, the product, or the product including the part as its component;
    wherein the image characteristics storage stores the identification information and image characteristics of the textured pattern formed on the part, the product, or the product including the part as its component after they are associated with each other; and
    wherein the processor is further programmed to identify the part, the product, or the product including the part as its component of a captured image by matching the image characteristics of the textured pattern corresponding to the identification information of the n-dimensional symbol acquired from the captured image with the image characteristics of the textured pattern extracted from the captured image.

11. The information acquisition and identification system according to claim 1,
    wherein the image characteristics storage and the processor are provided in an identification server,
    wherein the n-dimensional symbol indicates a URL of the identification server
    wherein the processor is further programmed to acquire the URL of the identification server from the extracted image of the n-dimensional symbol and transmits the captured image or the extracted image of the textured pattern to the identification server, and
    wherein the identification server identifies the part, the product, or the product including the part as its component by using the captured image or the extracted image of the textured pattern.

12. The information acquisition and identification system according to claim 1,
    wherein the n-dimensional symbol indicates at least one of a serial number, a name of manufacturer, a name of producer, a brand name, a product name, a product number, a rod number, and a URL.

13. A processing system comprising:
    a processor programmed to:
        form a textured pattern for identifying a part, a product, or a product including the
        part as its component over an n-dimensional symbol displaying information on the part or the product, wherein n is a natural number, wherein the textured pattern is provided on each of at least one die with predetermined granularity in order to identify a die used in manufacturing, wherein each individual is processed, in order to identify the each individual manufactured by a same die, with granularity smaller than the granularity at the time of processing the each of the at least one die, and wherein the textured pattern is formed in order to identify the part, the product, or the product including the part as its component.

14. The processing system according to claim 13,
wherein the processor is further programmed to form a textured pattern having granularity smaller than a short side of a cell of the n-dimensional symbol on the part, the product, or the product including the part as its component to which the n-dimensional symbol which indicates information on the part or the products is attached.

15. The processing system according to claim 13,
wherein the processor is further programmed to form the textured pattern on a portion at a position determined by the n-dimensional symbol.

16. The processing system according to claim 15,
wherein the processor is further programmed to form the textured pattern in a manner that granularity of the textured pattern is smaller than a short side of a cell of the n-dimensional symbol.

17. A registration system comprising:
a processor programmed to:
capture, an image including at least an n-dimensional symbol which indicates information on a part, a product, or a product including the part as its component, and a textured pattern having granularity smaller than a short side of a cell of the n-dimensional symbol, the textured pattern being formed over the n-dimensional symbol, under specific image capturing conditions, wherein n is a natural number;
extract an image of the textured pattern from the captured image; and
register in storing means identification information for identifying the part or the products and image characteristics of the extracted image of the textured pattern after they are associated with each other,
wherein the textured pattern is provided on each of at least one die with predetermined granularity in order to identify a die used in manufacturing,
wherein each individual is processed, in order to identify the each individual manufactured by a same die, with granularity smaller than the granularity at the time of processing the each of the at least one die, and
wherein the textured pattern is formed in order to identify the part, the product, or the product including the part as its component.

18. The registration system according to claim 17,
wherein the textured pattern is formed on an area at a position determined by the n-dimensional symbol.

19. A matching device comprising:
a processor programmed to
extract an image of an n-dimensional symbol and an image of a textured pattern from an image including at least the n-dimensional symbol for displaying information on a part, a product, or a product including the part as its component and the textured pattern formed over the n-dimensional symbol, wherein n is a natural number;
acquire information on the part or the products from the extracted image of the n-dimensional symbol;
acquire and output a check result obtained by checking the extracted image of the textured pattern against a database which stores image characteristics of textured patterns formed on component or products; and
extract the image of the textured pattern by removing a high frequency component corresponding to granularity of a satin finished surface from a captured image and taking a difference between the captured image and an image captured after the high frequency component is removed.

20. An information acquisition and identification method comprising:
extracting, by using a processor, an image of an n-dimensional symbol and an image of a textured pattern from an image including at least the n-dimensional symbol for displaying information on a part, a product, or a product including the part as its component and the textured pattern formed over the n-dimensional symbol, wherein n is a natural number;
acquiring, by using the processor, information on the part or the products from the extracted image of the n-dimensional symbol;
identifying, by using the processor, the part or a product including the product as its component by using image characteristics of the extracted image of the textured pattern; and
extracting, by using the processor, the image of the textured pattern by removing a high frequency component corresponding to granularity of a satin finished surface from a captured image and taking a difference between the captured image and an image captured after the high frequency component is removed.

21. A non-transitory computer readable storage medium Storing program for causing a computer to execute
extraction processing extracting an image of an n-dimensional symbol and an image of a textured pattern from an image including at least the n-dimensional symbol for displaying information on a part, a product, or a product including the part as its component and the textured pattern formed over the n-dimensional symbol, wherein n is a natural number;
acquisition processing acquiring information on the part or the products from the extracted image of the n-dimensional symbol;
acquisition and output processing acquiring and outputting a check result obtained by checking the extracted image of the textured pattern against a database which stores image characteristics of the formed textured pattern; and
extracting processing extracting the image of the textured pattern by removing a high frequency component corresponding to granularity of a satin finished surface from a captured image and taking a difference between the captured image and an image captured after the high frequency component is removed.

* * * * *